United States Patent
Ramos

(10) Patent No.: US 8,984,751 B2
(45) Date of Patent: Mar. 24, 2015

(54) COMPOSITE CONFIGURABLE SYSTEM TO SUPPORT SOLAR PANELS ON GEOMEMBRANE

(71) Applicant: Andrew R Ramos, Buckeye, AZ (US)

(72) Inventor: Andrew R Ramos, Buckeye, AZ (US)

(*) Notice: Subject to any disclaimer, the term of this patent is extended or adjusted under 35 U.S.C. 154(b) by 22 days.

(21) Appl. No.: 13/694,224

(22) Filed: Nov. 8, 2012

(65) Prior Publication Data
US 2013/0232757 A1 Sep. 12, 2013

Related U.S. Application Data

(63) Continuation-in-part of application No. 12/800,510, filed on May 17, 2010, now abandoned.

(51) Int. Cl.
B21D 53/00 (2006.01)
F24J 2/52 (2006.01)
F24J 2/46 (2006.01)

(52) U.S. Cl.
CPC .............. *F24J 2/5205* (2013.01); *F24J 2/5203* (2013.01); *Y02E 10/47* (2013.01); *F24J 2/5237* (2013.01); *F24J 2/526* (2013.01); *F24J 2002/4669* (2013.01); *F24J 2002/4692* (2013.01); *F24J 2002/5294* (2013.01); *Y02B 10/20* (2013.01)

USPC ................ 29/890.033; 29/897.32; 29/525.01; 29/525.02; 29/525.11; 52/173.3

(58) Field of Classification Search
CPC .................................. F24J 2/5203; Y02E 10/47
USPC ................ 29/890.033, 897.3, 897.32, 897.35, 29/525.01, 525.02, 525.11; 52/173.3
See application file for complete search history.

(56) References Cited

U.S. PATENT DOCUMENTS

| | | | | |
|---|---|---|---|---|
| 6,959,517 B2 * | 11/2005 | Poddany et al. | ............. | 52/173.3 |
| 7,748,175 B2 * | 7/2010 | Liebendorfer | ............... | 52/173.3 |
| 7,987,641 B2 * | 8/2011 | Cinnamon | .................. | 52/173.3 |
| 8,104,239 B2 * | 1/2012 | Fath | ............................ | 52/173.3 |
| 2003/0070368 A1 * | 4/2003 | Shingleton | .................... | 52/173.3 |
| 2011/0248137 A1 * | 10/2011 | Barba | ......................... | 248/309.1 |

* cited by examiner

*Primary Examiner* — Jermie Cozart
(74) *Attorney, Agent, or Firm* — Tod R. Nissle, P.C.

(57) ABSTRACT

A support system for solar panels utilizes metal and polymer support members having different coefficients of expansion in order to adapt to the expansion and contraction of a polymer liner that extends over a landfill. A fixation system utilized to interconnect the metal and polymer support members is molded into the polymer support members and is slidably connected to the metal and polymer support members to strengthen the support system and to compensate for different expansion and contraction rates of support system components and of the polymer liner.

3 Claims, 10 Drawing Sheets

COMPOSITE CONFIGURABLE SYSTEM TO SUPPORT SOLAR PANELS ON GEOMEMBRANE

This application claims priority on U.S. patent application Ser. No. 12/800,510 filed May 17, 2010 now abandoned.

This invention pertains to the disposition of solar panels.

Solar panels have for many years been mounted on roof tops and various other locations. A long existing motivation in connection with solar panels has been to improve systems used to mount the panels.

Therefore, it is a principal object of the invention to provide an improved system to mount solar panels.

This, and other, further and more specific objects and advantages of the invention will be apparent from the following detailed description thereof, taken in conjunction with the drawings, in which.

Figure 1:
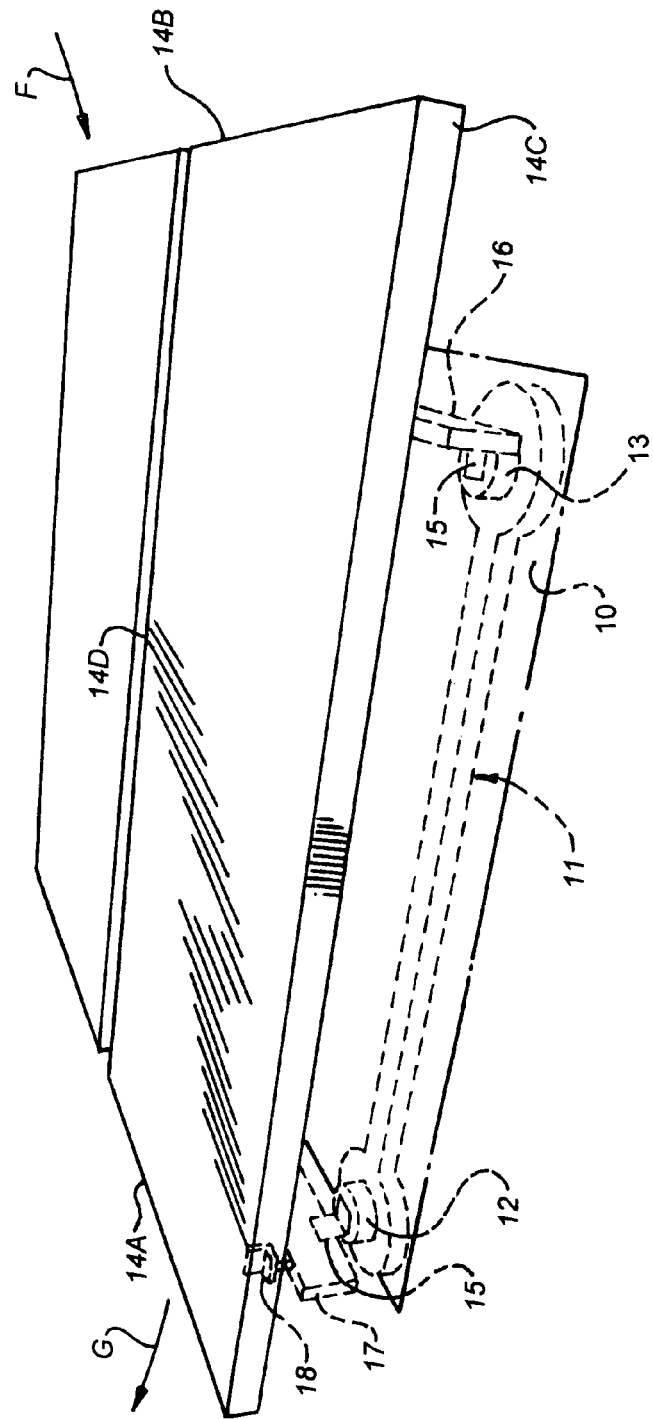
FIG. 1 is a perspective view illustrating a solar panel system installed according to the principles of the invention.

Briefly, in accordance with the invention, I provide an improved method to install solar panels over a landfill having an upper surface to compensate for expansion and contraction and improve shedding of rain water and wind resistance. The method includes the step of providing at least one orthogonal solar panel. The panel has a pair of opposing substantially parallel spaced apart side edges; a top edge normal to the side edges; and, a bottom edge spaced apart and substantially parallel to the top edge and normal to said side edges.

The method also includes the steps of providing a flexible polymer cover; providing at least first and second elongate polymer support members each having a first end, a second end, a middle section intermediate the first and second ends, and a longitudinal axis; and providing at least first and second elongate metal rails. Each rail includes a longitudinal axis; a top extending parallel to the longitudinal axis; a side substantially normal to the top and extending parallel to the longitudinal axis; a first channel extending inwardly from the top in a first direction, parallel to the longitudinal axis, and including at least a first capture flange (22A, 22B); and, a second channel extending inwardly from the side in a second direction normal to the first direction, parallel to the longitudinal axis, and including at least a second capture flange (20A, 20B).

The method also includes the step of providing at least a first clip to secure the solar panel to the first metal rail. The clip includes an upper portion shaped and dimensioned to engage the bottom edge of the solar panel and maintain a portion of the solar panel adjacent the first metal rail; and, includes a first connector member to extend into the first channel of the first rail for sliding movement therealong in a third direction parallel to the longitudinal axis and the top of the first rail and shaped and dimensioned to be retained in the first channel of the first rail by the first capture flange of the first rail such that the connector member can not be removed from the first channel of the first rail in a direction normal to the top of the first rail.

The method also includes the step of providing at least a first anchor member to secure the first rail to the polymer support member. The first anchor member includes an attachment system to secure slidably the first anchor member to the polymer support member; and, includes a second connector member to extend into the second channel of the first rail for sliding movement therealong in the third direction parallel to the longitudinal axis and the top of the first rail and shaped and dimensioned to be retained in the second channel of the first rail by the second capture flange of the first rail such that the connector member can not be removed from the first channel of the first rail in a direction normal to the side of the first rail.

The method also includes the steps of installing the polymer cover on the upper surface of the landfill; and, fixedly attaching the first and second ends of each of the first and second polymer support members to the polymer cover such that the first and second support members are in spaced apart parallel relationship, and such that the intermediate section is not secured to the polymer cover such that the polymer cover is free to expand and contract beneath, independently of, and separately from the intermediate section.

The method also includes the step of slidably attaching with the first anchor member the first rail to the first end of the first polymer support member such that the second connection system slidably secures the first anchor member to the first end of the polymer support member; such that the third connector member slidably extends into the first channel of the first rail for sliding movement therealong in the third direction; and, such that the first rail extends from the first end of the first polymer support member to the first end of the second polymer support member.

The method also includes the steps of attaching the second rail to the second ends of the first and second polymer support members such that the second rail is substantially parallel to the first rail and is normal to the longitudinal axes of the first and second polymer support members; placing the solar panel on top of and spanning the distance between the first and second parallel rails; slidably securing with the first clip the solar panel to the first rail such that the upper portion of the first clip engages the bottom edge of the solar panel, and such that the first connector member extends into the first channel of the first rail for sliding movement therealong. The sliding movement of the first anchor member with respect to the polymer support member, of the third connector member with respect to the first channel of the first rail, and of the first connector member with respect to the first channel of the first rail, coupled with the polymer cover freely expanding and contracting beneath, independently of, and separately from the intermediate section, compensates for polymer expanding and contraction and minimizing the likelihood of damage to the solar panel, the polymer cover, the polymer support members, and the rails.

In another embodiment of the invention, provided is an improved method to install solar panels over a landfill having an upper surface and a support structure to compensate for expansion and contraction and improve shedding of rain water. The method includes the step of providing at least one orthogonal solar panel. The panel has a pair of opposing substantially parallel spaced apart side edges; a top edge normal to the side edges; and, a bottom edge spaced apart and substantially parallel to the top edge and normal to the side edges.

The method also includes the steps of providing a flexible polymer cover; and, providing at least first, second, third, and fourth polymer support members. Each of the polymer support members has a first end; a second end; a middle section intermediate the first and second ends; a base; a skirt thermally bonded to the base; at least a first fastener shaped and dimensioned to extend downwardly through the polymer support member and the cover into the support structure; and, at least a second fastener shaped and dimensioned to extend upwardly through and outwardly from the polymer support member.

The improved method also includes the step of providing at least first and second elongate metal rails each having a coefficient of expansion less than that of the polymer support members and including a longitudinal axis; a top extending parallel to the longitudinal axis; a side substantially normal to the top and extending parallel to the longitudinal axis; a first channel extending inwardly from said top in a first direction, parallel to said longitudinal axis, and including at least a first capture flange (22A, 22B); and, a second channel extending inwardly from the side in a second direction normal to the first direction, parallel to the longitudinal axis, and including at least a second capture flange (20A, 20B).

The improved method also includes the step of providing at least a first clip to secure the solar panel to the first metal rail. The clip includes an upper portion shaped and dimensioned to engage the bottom edge of the solar panel and maintain a portion of the solar panel adjacent the first metal rail; and, a first connector member to extend loosely into the first channel of the first rail for free sliding movement therealong in a third direction parallel to the longitudinal axis and the top of the first rail and shaped and dimensioned to be retained in the first channel of the first rail by the first capture flange of the first rail such that the connector member is free to move with respect to the first rail and can not be removed from the first channel of the first rail in a direction normal to the top of the first rail.

The improved method also includes the step of providing at least a first anchor member to secure the first rail to the polymer support member. The first anchor member includes an attachment system to engage the second fastener and secure freely slidably the first anchor member to the polymer support member such that the first rail is free to move with respect to the polymer support member, and, includes a second connector member to extend loosely into the second channel of the first rail for free sliding movement therealong in the third direction parallel to the longitudinal axis and the top of the first rail and shaped and dimensioned to be retained in the second channel of the first rail by the second capture flange of the first rail such that the first rail is free to move with respect to the second connector member and the second connector member can not be removed from the first channel of the first rail in a direction normal to the side of the first rail.

The improved method also includes the steps of installing the polymer cover on the upper surface of the landfill; and, fixedly mounting the first, second, third, and fourth polymer support members on the polymer cover. The polymer support members are mounted on the polymer cover such that the first fastener of each of the polymer support members extends through the polymer cover into the support structure; the first, second, third, and fourth polymer support are in spaced apart parallel relationship; and, the skirt of each of the polymer support members is thermally welded to the polymer cover.

The improved method also includes the step of slidably attaching with the first anchor member the first rail to the first polymer support member such that the second connection system freely slidably loosely secures the first anchor member to the first fastener of the first polymer support member, such that the second connector member loosely slidably extends into the first channel of the first rail for free sliding movement therealong in the third direction; and, such that the first rail extends from the first polymer support member to the second polymer support member.

The improved method also includes the steps of attaching the second rail to the third and fourth polymer support members such that the second rail is substantially parallel to the first rail; placing the solar panel on top of and spanning the distance between said first and second parallel rails; and, slidably securing with the first clip the solar panel to the first rail. The clip secures the solar panel to the first rail such that the upper portion of the first clip engages the bottom edge of the solar panel, and the first connector member loosely extends into the first channel of the first rail for free sliding movement therealong. The free sliding movement of the first anchor member with respect to the polymer support member, of the second connector member with respect to the second channel of the first rail, and of the first connector member with respect to the first channel of the first rail, along with the polymer cover freely expanding and contracting between the first, second, third, and fourth polymer supports members, compensates for the expansion and contraction of the polymer by permitting the first rail, the first connector, and the second connector to slidably freely adjustably move and, consequently, minimizes the likelihood of damage to the solar panel, the polymer cover, the polymer support members, and the rails.

In a further embodiment of the invention, provided is an improved method to install solar panels over a landfill having an upper surface and a support structure to compensate for expansion and contraction and improve shedding of rain water. The improved method includes the step of providing at least one orthogonal solar panel having a pair of opposing substantially parallel spaced apart side edges; a top edge normal to the side edges; and, a bottom edge spaced apart and substantially parallel to the top edge and normal to the side edges.

The improved method also includes the steps of providing a flexible polymer cover; and, providing at least first, second, third, and fourth polymer support members. Each of the support members has a first end; a second end; a middle section intermediate the first and second ends; a base; a skirt thermally bonded to the base; at least a first fastener shaped and dimensioned to extend downwardly through the polymer support member and the cover into the support structure; and, at least a second fastener shaped and dimensioned to extend upwardly through and outwardly from the polymer support member.

The improved method also includes the step of providing at least first and second elongate metal rails each having a coefficient of expansion less than that of the polymer support members and including a longitudinal axis; including a top extending parallel to the longitudinal axis; including a side substantially normal to the top and extending parallel to the longitudinal axis; a first channel extending inwardly from the top in a first direction, parallel to the longitudinal axis, and including at least a first capture flange (22A, 22B); and, a second channel extending inwardly from the side in a second direction normal to the first direction, parallel to the longitudinal axis, and including at least a second capture flange (20A, 20B).

The improved method also includes the step of providing at least a first clip to secure the solar panel to the first metal rail and including an upper portion shaped and dimensioned to engage the bottom edge of the solar panel and maintain a portion of the solar panel adjacent the first metal rail; and, including a first connector member to extend into the first channel of the first rail for sliding movement therealong in a third direction parallel to the longitudinal axis and the top of the first rail and shaped and dimensioned to be retained in the first channel of the first rail by the first capture flange of the first rail such that the connector member can not be removed from the first channel of the first rail in a direction normal to the top of the first rail.

The improved method also includes the step of providing at least a first anchor member to secure the first rail to the first polymer support member and including an attachment system to engage the second fastener and secure the first anchor member to the polymer support, and including a second connector member to extend into the second channel of the first rail for sliding movement therealong in the third direction parallel to the longitudinal axis and the top of the first rail and shaped and dimensioned to be retained in the second channel of the first rail by the second capture flange of the first rail such that the second connector member can not be removed from the first channel of the first rail in a direction normal to the side of the first rail.

The improved method also includes the steps of installing said polymer cover on the upper surface of the landfill; and, fixedly mounting the first, second, third, and fourth polymer support members on said polymer cover such that the first fastener of each of the polymer support members extends through the polymer cover into the support structure, such that the first, second, third, and fourth polymer support members are in spaced apart parallel relationship, and such that the skirt of each of said polymer support members is thermally welded to the polymer cover.

The improved method also includes the step of slidably attaching with the first anchor member the first rail to the first polymer support member such that the second connection system secures the first anchor member to the first fastener of the first polymer support member, such that the third connector member slidably extends into the first channel of the first rail for sliding movement therealong in the third direction, and, such that the first rail extends from the first polymer support member to the second polymer support member.

The improved method also includes the steps of attaching the second rail to the third and fourth polymer support members such that the second rail is substantially parallel to the first rail, of placing the solar panel on top of and spanning the distance between the first and second parallel rails, and of slidably securing with the first clip the solar panel to the first rail. The solar panel is secured to the first rail such that the upper portion of the first clip engages the bottom edge of the solar panel, and the first connector member extends into the first channel of the first rail for sliding movement therealong.

In still another embodiment of the invention, provided is an improved method to install solar panels over a landfill having an upper surface and a support structure to compensate for expansion and contraction and to improve shedding of rain water. The method the step of providing at least one orthogonal solar panel having a pair of opposing substantially parallel spaced apart side edges, having a top edge normal to the side edges, and having a bottom edge spaced apart and substantially parallel to the top edge and normal to the side edges.

The improved method also includes the steps of providing a flexible polymer cover; providing at least first, second, third, and fourth polymer support members each having a first end, a second end, a middle section intermediate said first and second ends; and, of providing at least first and second elongate metal rails. Each metal rail has a coefficient of expansion less than that of the polymer support members and includes a longitudinal axis; includes a top extending parallel to the longitudinal axis; includes a side substantially normal to the top and extending parallel to the longitudinal axis; includes a first channel extending inwardly from the top in a first direction, parallel to the longitudinal axis; and including at least a first capture flange (22A, 22B); and, includes a second channel extending inwardly from the side in a second direction normal to the first direction, parallel to the longitudinal axis, and including at least a second capture flange (20A, 20B).

The improved method also includes the step of providing at least a first clip to secure loosely the solar panel to said first metal rail. The first clip includes an upper portion shaped and dimensioned to engage the bottom edge of the solar panel and maintain a portion of the solar panel adjacent the first metal rail; and, includes a first connector member to extend loosely into said first channel of the first rail for free loose sliding movement therealong in a third direction parallel to the longitudinal axis and the top of the first rail and shaped and dimensioned to be retained in the first channel of the first rail by the first capture flange of the first rail such that the connector member is free to move with respect to the first rail and can not be removed from the first channel of the first rail in a direction normal to the top of the first rail.

The improved method also includes the step of providing at least a first anchor member to secure the first rail to the polymer support member. The first anchor member includes an attachment system to engage the second fastener and secure freely slidably loosely the first anchor member to the polymer support member such that the first rail is free to move with respect to the polymer support member; and, includes a second connector member to extend loosely into the second channel of the first rail for free loose sliding movement therealong in the third direction parallel to the longitudinal axis and the top of the first rail and shaped and dimensioned to be retained in the second channel of the first rail by the second capture flange of the first rail such that the first rail is free to move with respect to the second connector member and the second connector member can not be removed from the first channel of the first rail in a direction normal to the side of the first rail.

The improved method also includes the steps of installing the polymer cover on the upper surface of the landfill; fixedly mounting the first, second, third, and fourth polymer support members on the polymer cover such that the first, second, third, and fourth polymer support members are in spaced apart parallel relationship; and, slidably attaching with the first anchor member the first rail to the first polymer support member. The first rail is attached to the first polymer support member such that the second connection system freely slidably secures the first anchor member to the first polymer support member; such that the second connector member slidably loosely extends into the first channel of the first rail for free sliding movement therealong in the third direction;

and, such that the first rail extends from the first polymer support member to the second polymer support member.

The improved method also includes the steps of attaching the second rail to the third and fourth polymer support members such that the second rail is substantially parallel to the first rail; placing the solar panel on top of and spanning the distance between the first and second parallel rails; and, slidably securing with the first clip the solar panel to the first rail such that the upper portion of said first clip engages the bottom edge of the solar panel, and such that the first connector member loosely extends into the first channel of the first rail for free loose sliding movement therealong. The free loose sliding movement of the first anchor member with respect to the polymer support member; of the second connector member with respect to the second channel of the first rail; and, of the first connector member with respect to the first channel of the first rail, along with the polymer cover freely expanding and contracting between the first, second, third, and fourth polymer supports members, compensating for the expansion and contraction of the polymer cover by permitting the first rail, the first connector, and the second connector to slidably freely loosely move and, consequently, minimizing the likelihood of damage to the solar panel, the polymer cover, the polymer support members, and the rails.

In another embodiment of the invention, provided is a method to install a mounting system on a support structure. The method includes the step of providing at least first, second, third, and fourth polymer support members. Each of the support members has a first end; a second end; a middle section intermediate the first and second ends; a base; a skirt thermally bonded to the base; at least a first fastener shaped and dimensioned to extend downwardly through the polymer support member and the cover into the support structure. The first fastener includes a head recessed in the polymer support member. Each of the support members has a thin polymer panel member sealingly covering the head of the first fastener; and, at least a second fastener shaped and dimensioned to extend upwardly through and outwardly from the polymer support member. The method also includes the step of fixedly mounting the first, second, third, and fourth polymer support members on the polymer cover such that the first fastener of each of the polymer support members extends through the polymer cover into the support structure; such that the first, second, third, and fourth polymer support members are in spaced apart relationship; and, such that the skirt of each of the polymer support members is thermally welded to the polymer cover.

Turning now to the drawings, which depict the presently preferred embodiments of the invention for the purpose of illustrating the practice thereof and not by way of limitation of the scope of the invention, and in which like reference characters refer to corresponding elements throughout the several views, FIGS. 1 to 4 illustrate a solar panel system including a pliable polymer liner 10 covering a landfill (not shown) or other ground area or structure. While the shape and dimension of a solar panel can vary as desired, in FIG. 1 one or more orthogonal solar panels 14 are supported on a framework that includes at least a pair of spaced-apart parallel metal rails 16 and 17 and a plurality of spaced apart elongate polymer support members 11 each having a first end 12 and a second end 13. As would be appreciated by those of skill in the art, structures other than solar panels and rails 16, 17 can be mounted on and supported by members 11.

Each solar panel includes a pair of opposing substantially parallel spaced apart side edges 14A, 14B, a top edge 14D, and a bottom edge 14C.

Each elongate polymer support member 11 includes a first end 12, a second end 13, a middle section intermediate said first and second ends, and a longitudinal axis extending through said middle section and each end 12, 13.

Figure 4:
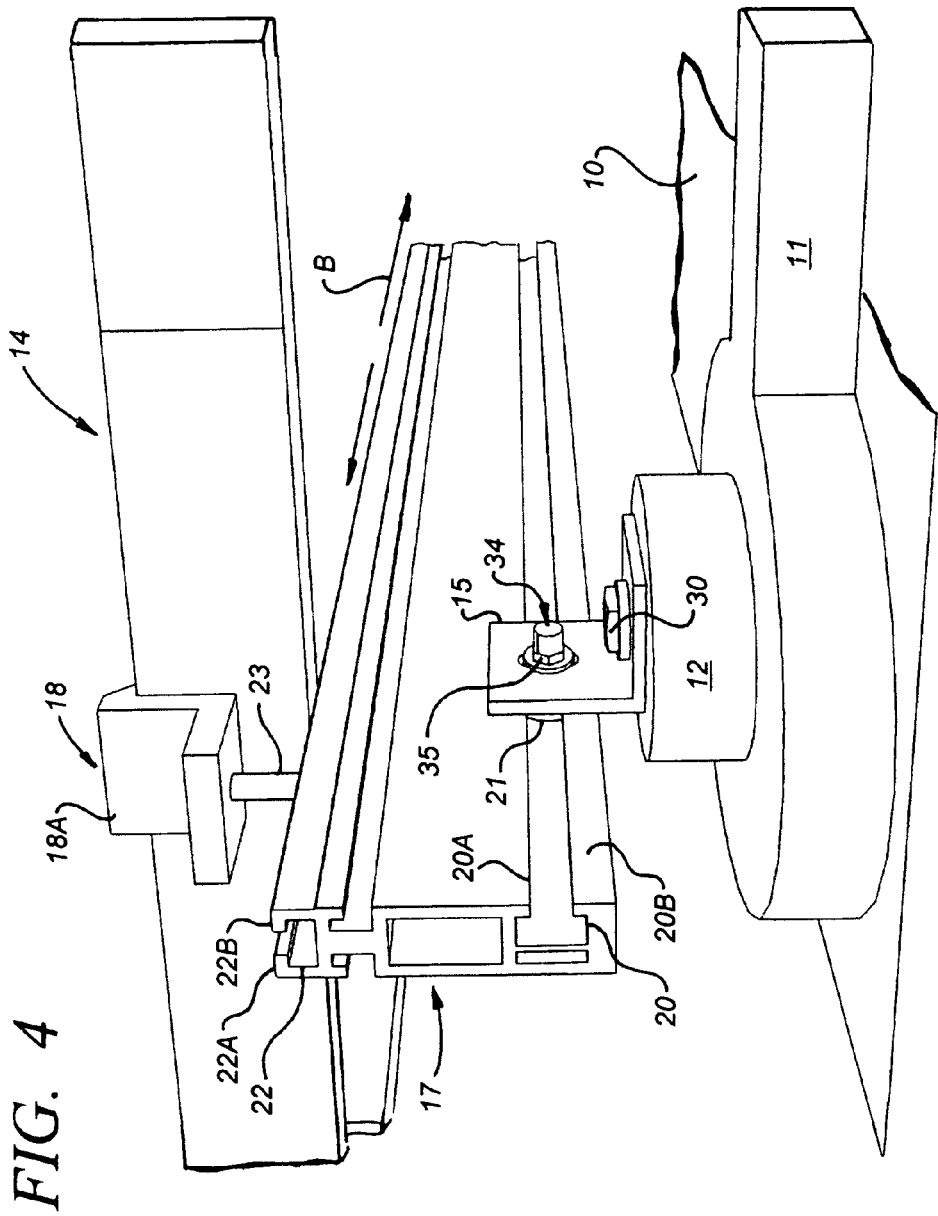
FIG. 4 is a perspective view of portions of the solar panel system of FIG. 1 illustrating construction details thereof.

Each rail 16, 17 includes a longitudinal axis, a top extending parallel to the longitudinal axis, a side substantially normal to said top and extending parallel to the longitudinal axis, a first channel 22, and a second channel 20. First channel 22 extends inwardly from the top in a first direction, extends parallel to the longitudinal axis, and includes at least a first capture flange 22A, 22B (FIG. 4). Second channel 20 extends inwardly from the side in a second direction at an angle to said first direction, extends parallel to the longitudinal axis and the first channel 22, and includes at least a second capture flange 20A, 20B (FIG. 4).

Clips 18 secure each solar panel 14 to rails 16 and 17. One clip 18 secures bottom edge 14C to rail 17. A second clip 18 secures bottom edge 14C to rail 16. A third clip 18 secures top edge 14D to rail 17. A fourth clip 18 secures top edge 14D to rail 16. A clip 18 includes an upper portion 18A shaped and dimensioned to engage the bottom 14C or top 14D edge of a panel 14. Clip 18 also includes a connector member 23 (FIGS. 3, 4) that links clip 18 with rail 17 and extends into the first channel 22 of a rail for sliding movement therealong in a third direction B that is parallel to the longitudinal axis of the rail and to the top of the rail and that is shaped and dimensioned to be retained in the first channel 22 of the rail by the capture flanges 22A and 22B such that connector member 23 can not be removed from channel 22 in a direction normal to the top of the rail. In other words, connector member 23 includes a head 23A (FIG. 3) comparable to head 21 of connector member 34. Head 21 is slidably received by channel 20 by inserting head 21 into channel 20 at one end of a rail 16, 17 and by sliding head 21 along channel 20. Head 21 is large enough to extend behind capture flanges 20A and 20B and can not therefore be pulled outwardly from channel 20 in a direction that is, in FIG. 3, parallel to the longitudinal axis of member 11 and normal to the longitudinal axis of rail 17. Capture flanges 20A and 20B retain head 21 in channel 20 but do not prevent head 21 from sliding freely along channel 20 limited distances in opposing directions each parallel to the longitudinal axis of rail 17. In another embodiment of the invention, head 21 is mounted in rail 17 such that the head 23A of member 21 is tightly held against capture flanges 20A and 20B and can not slide along channel 20. A stop(s) (not shown) can be installed in channel 20 to restrict the sliding movement of head 21 along channel 20.

Figure 3:
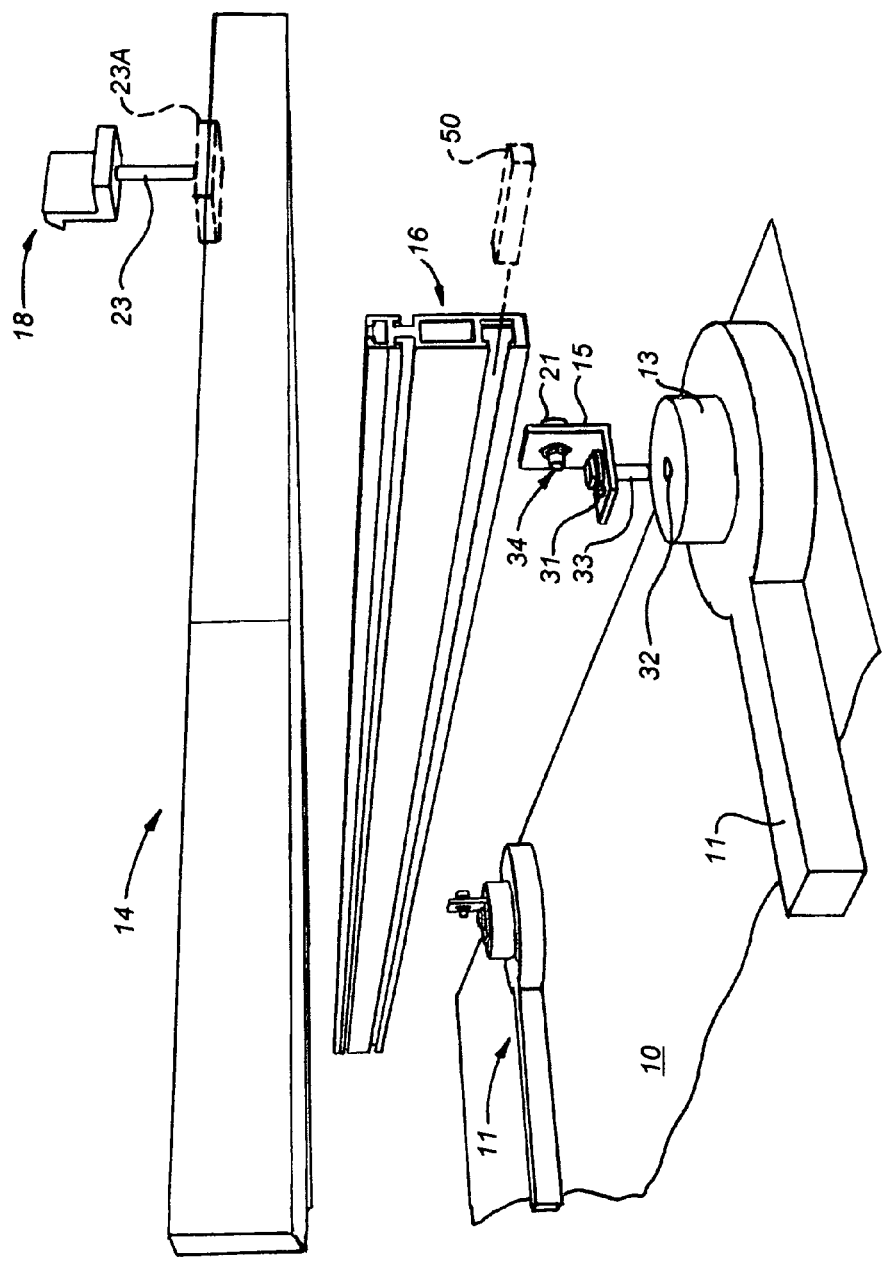
FIG. 3 is a perspective view of portions of the solar panel system of FIG. 1 illustrating construction details thereof.

The head 23A (FIG. 3) on member 23 similarly can slide freely along channel 22 (FIG. 4) limited distances in opposing directions parallel to the longitudinal axis of a rail 16, 17, but capture flanges 22A and 22B retain the head 23A of member 23 in channel 22 and prevent the head from being pulled from channel 22 in a direction that is normal in FIG. 3 both to cover 10 and to the longitudinal axis of member 11. In another embodiment of the invention, member 23 is mounted on clip 18 such that the head 23A of member 23 is tightly held against capture flanges 22A and 22B and can not slide along channel 22. A stop(s) (not shown) can be installed in channel 22 to restrict the sliding movement of head 23A along channel 22.

L-shaped anchor member 15 includes a connection system to secure slidably the member 15 to one end 12 of member 11. Although the construct of the anchor member 15 and of the connection or linkage system used with member 15 can vary as desired, the connection system illustrated in FIGS. 1 to 4 comprises a bolt 30 including a leg 33 which turns into an internally threaded aperture 32 (FIG. 3) formed in an end 12, 13 of a member 11. The bottom leg of L-shaped anchor member 15 includes an elongate ovate opening 31 (FIG. 3) formed therethrough so that once bolt 30 is installed to link and secure loosely member 15 to end 12, ovate opening 31 permits the bottom leg of member 15 to slide freely loosely back and forth about leg 33 of bolt 30 in directions indicated by arrows D (FIG. 2), which directions are parallel to the longitudinal axis of member 11 and normal to the longitudinal axis of rails 16 and 17. Ovate opening 31 does, however, restrict the extent of such movement. In an alternative embodiment of the invention, bolt 30 is tightly inserted in an aperture 32 such that the bottom leg of member 15 is tightly secured to an end 12, 13 and cannot slide back and forth about leg 33 of bolt 30.

Figure 2:
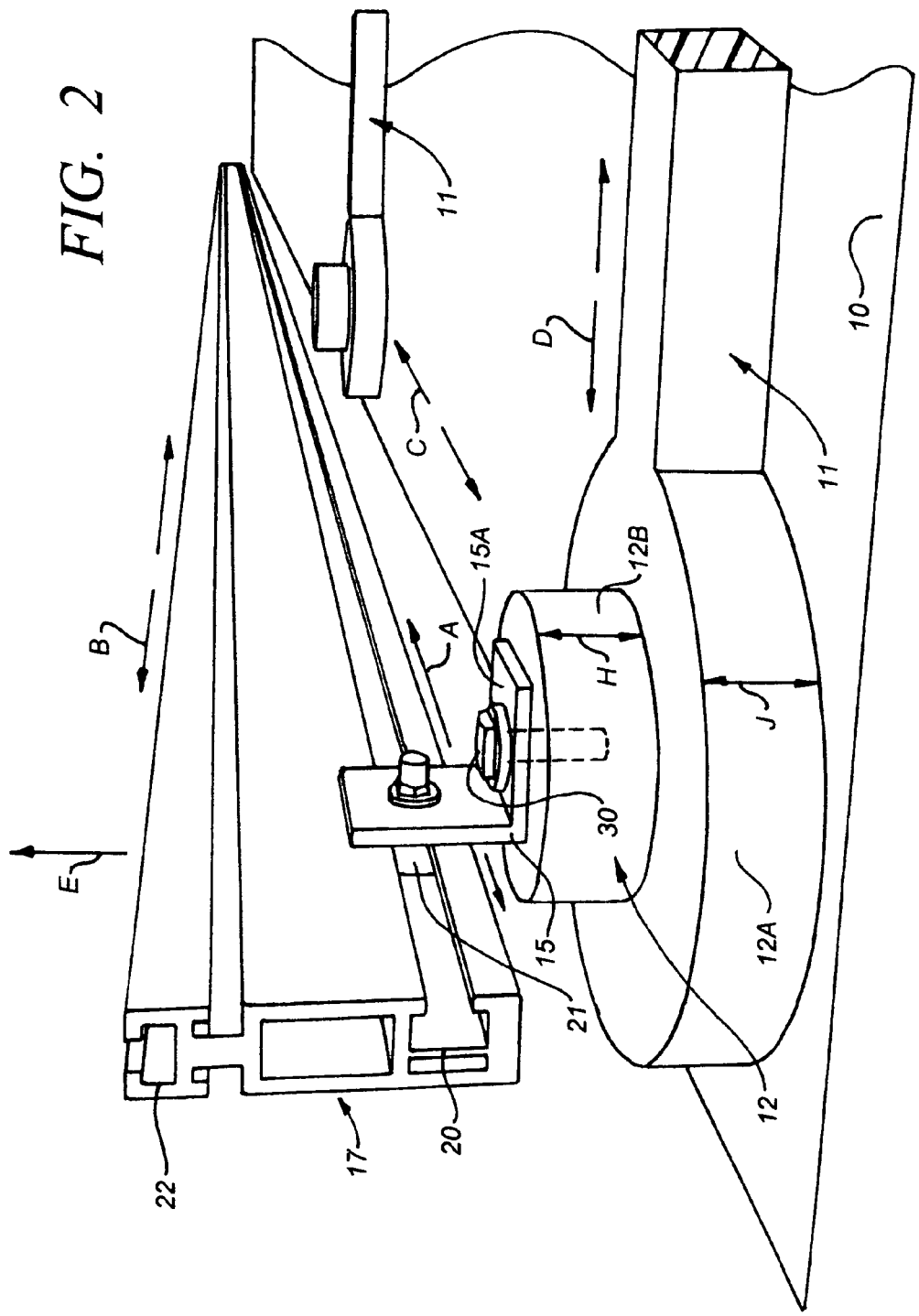
FIG. 2 is a perspective view of portions of the solar panel system of FIG. 1 illustrating construction details thereof.

Anchor member 15 also includes a connector member 34 which extends through an opening formed through the upright leg of L-shaped anchor member 15 and extends into channel 20. Member 34 includes, as noted, head 21 (FIGS. 2, 4). An externally threaded leg extends outwardly from head 21 and through the upstanding leg of member 15 and is secured by an internally threaded nut 35 (FIG. 4) that is turned onto the externally threaded leg extending from head 21. Head 21 is slidably received by channel 20 by inserting head 21 into channel 20 at one end of a rail 16, 17 and by sliding head 21 along channel 20. In another embodiment of the invention, nut 35 is tightly turned onto the externally threaded leg of member 34 so that head 21 is fixed in and can not slide along channel 22. In this embodiment of the invention, head 21 is tightly pulled against capture flanges 20A and 20B when nut 35 is tightened.

A linear array of solar panels 14 can be arranged side-by-side each centered on a common longitudinal axis that is parallel to the ground and to the face of each panel. In another embodiment of the invention, multiple linear arrangements of solar panels are utilized with each linear arrangement radiating from a central point like the spokes on a wheel. The shape and dimension of a member 11 or rail 16, 17 can vary as desired.

In use, a plurality of members 11 are attached to a pliable polymer cover 10 that contacts and extends over the surface of a landfill or other desired location or object or structure. Members 11 are parallel and are spaced apart a selected distance that typically is less than the length of each rail 16, 17. Each member 11 can be secured to cover 10 along the entire length of member 11, but it is presently preferred that only the ends 12, 13 are attached with adhesive, ultrasonic welding, etc. When only the ends 12, 13 are attached, the portion of each member 11 that is intermediate the ends is free to slide over cover 10 (or vice-versa) when member 11 expands and contracts as the result of variations in the ambient temperature. Thermoplastic materials which can be utilized in the manufacture of member 11 or of cover 10 can exhibit a relatively high tendency to expand and contract when subjected to a temperature change; as much as about ten times that which is exhibited by metals.

A bolt 30 (FIGS. 2, 4) is turned through slot 31 (FIG. 3) into an aperture in end 12 of a first member 11 to connect a first anchor member 15 to the end 12. A second bolt 30 is turned through a slot 31 in the second anchor member and into an aperture in end 12 of a second member 11 to connect a second anchor member 15 to the end 12. See FIGS. 2 and 3. Additional bolts 30 can, if desired, be utilized to connect additional members 15 to the ends 12, 13 of additional members 11.

A third bolt 30 is turned into an aperture 32 in end 13 of the first member 11 to connect a third anchor member to the end 13 of the first member 11. A fourth bolt 30 is turned into an aperture 32 in end 13 of the second member 11 to connect a fourth anchor member 15 to end 13 of the second member 11. Additional bolts 30 can, if desired, be utilized to connect additional anchor members 15 to the ends 13 of additional members 11.

A first connector member 34 is utilized to connect the first anchor member 15 to rail 17. The first connector member extends through the upright leg of L-shaped anchor member 15 and into channel 20 of rail 17. Member 34 includes head 21 (FIGS. 2, 4). An externally threaded leg extends outwardly from head 21 and through the upstanding leg of member 15 and is secured by a nut 35 (FIG. 4). Nut 35 is tightened sufficiently to secure member 15 to rail 17 while permitting head 21 to freely slide along channel 20 in directions indicated by arrows A in FIG. 2.

A second connector member 34 is utilized to connect the second anchor member 15 to rail 17. The second connector member 34 extends through the upright leg of L-shaped anchor member 15 and into channel 20 of rail 17. The second connector member 34 includes head 21 (FIGS. 2, 4). An externally threaded leg extends outwardly from head 21 and through the upstanding leg of second member 15 and is secured by a nut 35 (FIG. 4). Nut 35 is tightened sufficiently to secure the second member 15 to rail 17 while permitting head 21 to freely slide along channel 20 in directions indicated by arrows A in FIG. 2.

A third connector member 34 is utilized to connect the third anchor member 15 to rail 16. The third connector member 34 extends through the upright leg of the L-shaped third anchor member 15 and into channel 20 of rail 16. Member 34 includes head 21 (FIGS. 2, 4). An externally threaded leg extends outwardly from head 21 and through the upstanding leg of third member 15 and is secured by a nut 35 (FIG. 4). Nut 35 is tightened sufficiently to secure third member 15 to rail 16 while permitting head 21 to freely slide along channel 20 of rail 16 in directions parallel to the longitudinal axis of rail 16.

A fourth connector member 34 is utilized to connect the fourth anchor member 15 to rail 16. The fourth connector member 34 extends through the upright leg of the L-shaped fourth anchor member 15 and into channel 20 of rail 16. Member 34 includes head 21 (FIGS. 2, 4). An externally thread leg extends outwardly from head 21 and through the upstanding leg of fourth member 15 and is secured by a nut 35 (FIG. 4). Nut 35 is tightened sufficiently to secure fourth member to rail 16 while permitting head 21 to freely slide along channel 20 of rail 16 in directions parallel to the longitudinal axis of rail 16.

After the first, second, third, and fourth anchor members 15 are secured to members 11 and to rails 16 and 17 in the manner noted above, rails 16 and 17 have been mounted on members 11 in parallel relationship in the manner illustrated in FIGS. 1 and 2.

An orthogonal solar panel 14 is set on top of rails 16 and 17 in the manner illustrated in FIG. 1 such that the top 14D and bottom 14C are substantially normal to the longitudinal axes of rails 16 and 17 and such that the sides 14A and 14B are each substantially parallel to the longitudinal axes of rails 16 and 17.

A first clip 18 is used to secure the bottom edge 14C of panel 14 to rail 17. A second clip 18 is used to secure the bottom edge 14C of panel 14 to rail 16. A third clip 18 is used to secure the top edge 14D of panel 14 to rail 17. A fourth clip 18 is used to secure the top edge 14D of panel 14 to rail 16. Each clip 18 includes a connector member 23 and includes an upper portion 18A. Portion 18A is shaped and dimensioned to engage the bottom 14C or top 14D edge of a panel 14. Each clip 18 is connected to a rail 16, 17 such that the clip functions to hold panel 14 snugly against the top of rails 16 and 17 but also permits connector member 23 (FIGS. 3, 4) to slide along the channel 22 formed in the top of the rail. As earlier noted, the connector includes a head 23A, similar to head 21, that is shaped and dimensioned to be retained in channel 22 of the rail by the capture flanges 20A and 20B such that connector member 23 can not be removed from channel 22 in a direction normal to the top of the rail.

Stops 50 can be inserted in rails 16, 17 at the ends of channels 20 and 22 to prevent head 21 and member 23 from sliding out the ends of rails 16, 17.

In one particular presently preferred embodiment of the invention described above, the intermediate portion of member 11 is not adhered to cover 10, anchor member 15 can freely loosely slide with respect to member 11 (i.e., member 15 is not fixed in one set position with respect to member 11), head 21 can freely loosely slide along channel 20 (i.e., head 21 is not fixed in one set position in channel 20), and member 23 can freely loosely slide along channel 22 (i.e., member 23 is not fixed in one set position in channel 22). Such a "loose" fitting construction is important because it helps compensate for the expansion and contraction of the support structure with changes in ambient temperature.

The spacing between members 11, along with not attaching the intermediate section of each member 11 to cover 10, reduces the risk that expansion and contraction of system components will damage cover 10 or panels 14.

Polymer members 11 preferably are not attached to cover 10 with fasteners that penetrate cover 10.

If desired, rails 16 and 17 can be fabricated from a polymer material. A metal is, however, preferred in the construction of rails 16 and 17 because of its lower coefficients of expansion. Pliable polymer cover 10 can, by way of example and not limitation, be fabricated from high density polyethylene, TPO. Polypropylene, EPDM, etc.

While the height, indicated by arrows J and H, respectively, of cylindrical members, or "pucks", 12A and 12B comprising an end 12 can vary as desired, such height for each member 12A and 12B is presently one inch and serves to space panels 14 above liner 10. Such spacing is important because it permit breeze or wind to flow beneath panels 14 in the manner indicated by arrow F in FIG. 1, to flow intermediate panels 14 and liner 10, and to flow out form beneath panels 14 in the manner indicated by arrow G in FIG. 1. The parallel configuration of members 11 further facilitates such air flow when the direction of the breeze or wind is substantially parallel to the longitudinal axes of members 11.

Figure 5:
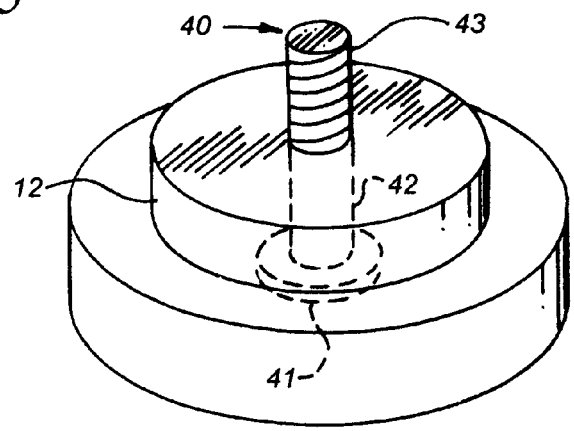
FIG. 5 is a perspective view of a portion of the solar panel system of FIG. 1 illustrating an alternate fixation system.

Specially constructed fixation systems can be utilized to improve the strength of the mounting system of the invention. FIG. 5 illustrates one such system in which bolt 30 is not utilized to affix bracket 15 to end 12. Instead, a member 40 is, during the molding of end 12 (and/or 13), molded into end 12 (or 13) in the manner indicated in FIG. 5. Head or flange 41 and cylindrical neck 42 are molded into end 12 such that externally threaded end 43 of member 40 extends outwardly away from end 12. When bracket 15 is affixed to end 12, end 43 extends upwardly through slot 31 and internally threaded nut 44 is turned onto externally threaded end 43 to secure bracket 15 on end 12. The construction of FIG. 5 is presently preferred in the practice of the invention because initial testing of that kind of construction indicates it can withstand an upward force E (FIG. 1) of up to 4000 pounds. Such strength is important in improving the wind resistance of the solar panel support system of the invention.

Figure 6:
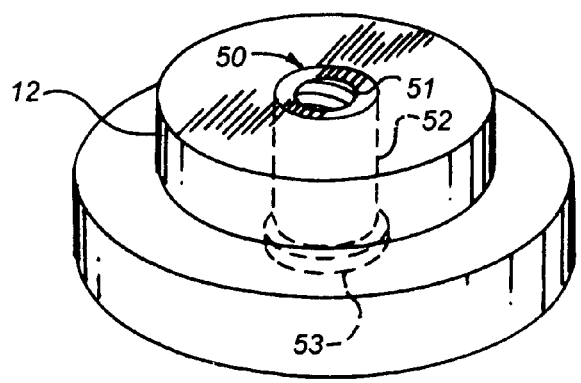
FIG. 6 is a perspective view of a potion of the solar panel system of FIG. 1 illustrating still another alternate fixation system.

Another system which can be utilized to improve the strength of the mounting system of the invention is illustrated in FIG. 6 and includes a member 50 which is molded into end 12 in the manner indicated in FIG. 6. Head or flange 53 and cylindrical neck 52 are molded into end 12 (and/or 13) such that internally threaded aperture 51 is accessible from the top of end 12. During fixation of bracket 15 to end 12, externally threaded leg 33 of bolt 30 extends through slot 31 and is turned into aperture 51. This construction is advantageous because initial testing of that kind of the construction indicates it can withstand an upward force E (FIG. 1) of up to about 2000 pounds.

Figure 7:
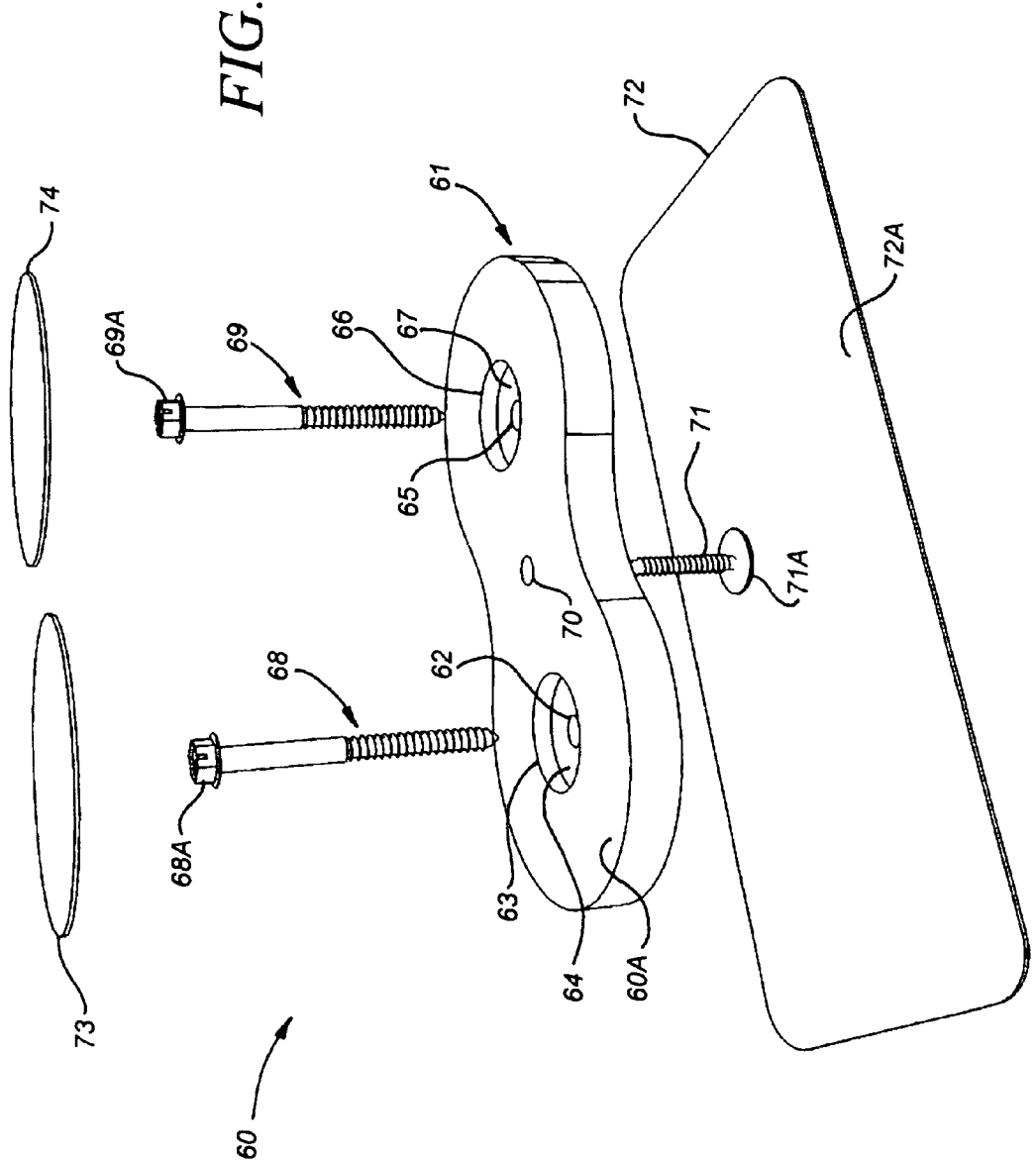
FIG. 7 is an exploded perspective upper view illustrating a support member utilized in an alternate embodiment of the invention.
Figure 8:
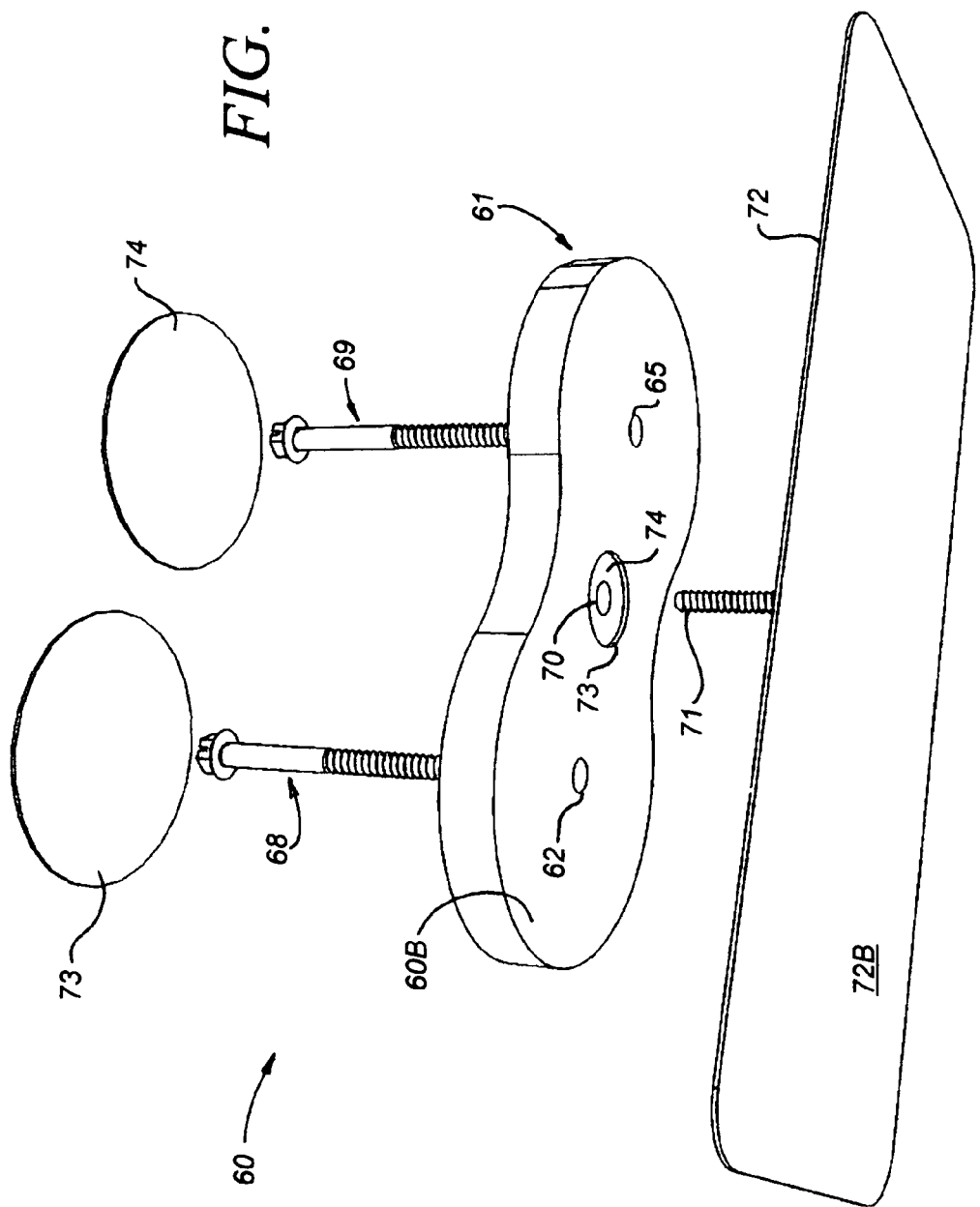
FIG. 8 is an exploded perspective lower view further illustrating construction details of the embodiment of the invention in FIG. 7.
Figure 9:
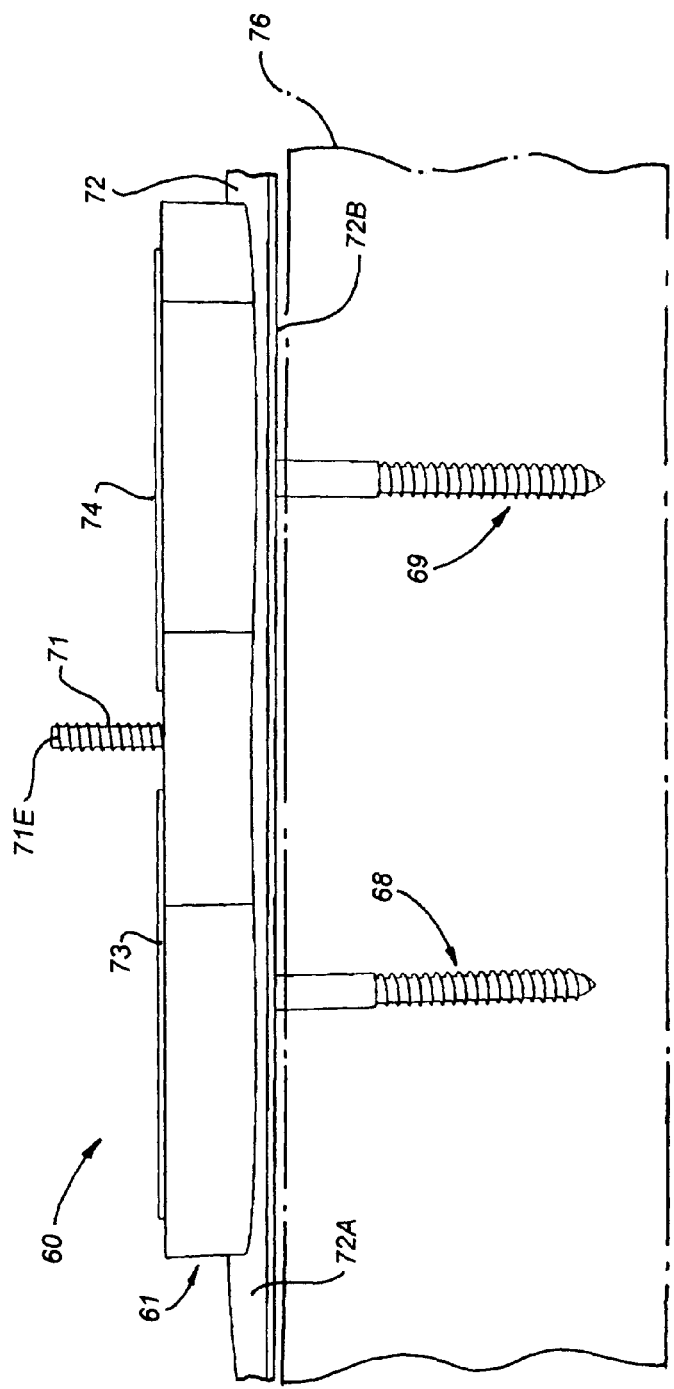
FIG. 9 is a side elevation view further illustrating the support member of FIG. 7.

FIGS. 7 to 9 illustrate a support member utilized in an alternate embodiment of the invention and generally indicated by reference character 60. Member 60 includes generally oval shaped base 61. As would be appreciated by those of skill in the art, the shape and dimension of base 61 and various other components described with reference to the various drawing Figs. herein can vary as desired.

Base 61 can be fabricated from any desired material, but presently preferably comprises a polymer which can be thermally welded or otherwise sealingly secured to circular polymer patches 73 and 74 and to polymer skirt 72. The material utilized to fabricate patches 73, 74 and skirt 72 likewise can vary as desired, but presently preferably comprises a polymer which can be thermally welded to base 61. Polymer materials normally do not have corrosion problems that often are associated with material made from metal.

Base 61 includes apertures 62, 65, and 70 extending therethrough. Aperture 63 has a larger diameter than aperture 62, is inset in base 61, and extends only partially therethrough a distance sufficient for the head 68A of bolt 68 to seat in aperture 63. Aperture 65 has a large diameter than aperture 65, is inset in base 61, and extends only partially therethrough a distance sufficient for the head 69A of bolt 69 to seat in aperture 66. Aperture 63 includes circular floor 64. Aperture 66 includes circular floor 67.

After bolt 68 is inserted in aperture 62 to the position illustrated in FIG. 9, head 68A preferably is completely within aperture 63 such that the uppermost part of head 68A is flush with or below an imaginary plane extending through the upper surface 60A of base 61. After bolt 68 is inserted in aperture 62, is turned through cover 10 into wood or some other support structure located beneath cover 10, and achieves the position illustrated in FIG. 9, the circular periphery of polymer patch 73 is thermally sealingly welded to upper surface 60A of base. 61. The seal preferably continuously extends around the periphery of patch 73 such that water or other material is prevented from moving between patch 73 and upper surface 60A. Bolt 68 is inserted in aperture 62 when support member 60 is being affixed to wood 76 (FIG. 9) or some other structure beneath or above the polymer cover on a landfill, or is being affixed to some other structure. In the event member 60 is affixed to the polymer cover by simply welding skirt 72 to the cover and by not utilizing bolts 68 and 69, the patch 73 can still, if desired, be sealingly welded to upper surface 60.

Similarly, after bolt 69 is inserted in aperture 65 to the position illustrated in FIG. 9, head 69A preferably is completely within inset aperture 66 such that the uppermost part of head 69A is flush with or below an imaginary plane extending through the upper surface 60A of base 61. After bolt 69 is inserted in aperture 65, is turned through cover 10 into wood or some other support structure located beneath cover 10, and achieves the position illustrated in FIG. 9, the circular periphery of polymer patch 74 is thermally sealingly welded to upper surface 60A of base 61. The seal preferably continuously extends around the periphery of patch 74 such that water or other material is prevented from moving between patch 74 and upper surface 60A. Bolt 69 is inserted in aperture 65 when support member 60 is being affixed to wood 76 (FIG.

9) or some other structure beneath or above the polymer cover on a landfill, or is being affixed to some other structure. In the event member 60 is affixed to the polymer cover by simply welding skirt 72 to the cover and by not utilizing bolts 68 and 69, the patch 74 can still, if desired, be sealingly welded to upper surface 60A.

After bolt 71 is inserted in aperture 70 to the position illustrated in FIG. 9, head 71A preferably is completely within inset aperture 73 such that the uppermost part of head 71A is flush with or below an imaginary plane extending through the bottom surface 60B of base 61. Aperture 73 includes circular floor 74. Head 71A is thermally sealingly welded or otherwise secured to floor 74.

After head 71A is thermally welded to floor 74, bottom surface 60B is thermally sealingly welded to thin, orthogonal, elongate polymer skirt 72. Skirt 72 is shaped and dimensioned to be larger than bottom surface 60B such that the periphery of skirt 72 extends outwardly away from base 61. This permits peripheral portions of skirt 72 to be thermally welded or otherwise adhered or secured to a polymer landfill cover 10 and to some other desired object. After skirt 72 is thermally welded to a polymer landfill cover to seal skirt 72 to the cover, the seal preferably extends continuously around the periphery of skirt 72 and, accordingly, around base 61 so that water or other material is prevented from getting between skirt 72 and the polymer cover 10. Thermal welding is a preferred fixation method in the practice of the invention because it does not require an additional construction material (i.e., adhesive), tends to have a longer life than adhesive, and produces a more reliable seal.

Recessing heads 68A, 69A, 71A is an important feature of the invention because it reduces the likelihood that heads 68A, 69A, 71A will puncture patch 73, patch 74, or skirt 72, respectively, and it facilitates securing patches 73 and 74 and skirt 72 to support member 60.

In use, the system as depicted in FIGS. 1 to 4 is utilized, except that each member 11 is replaced by a pair of members 60. A first bracket 15 is utilized in FIG. 2 to secure one end of rail 17 to upstanding fastener 71 of a first member 60 (after member 60 has been mounted on and secured in a desired position on cover 10). A second bracket 15 is utilized to secure one end of rail 16 to upstanding fastener 71 of a second member 60. A third bracket 15 is utilized to secure the other end of rail 17 to upwardly projecting fastener 17 of a third member 60. And, a fourth bracket 15 is utilized to secure the other end of rail 16 to upwardly projecting fastener 17 of a fourth member 60. The first, second, third and fourth members 60 are spaced apart from one another and are mounted on cover 10 such that after rail 16 is mounted on the first and third members 60, and rail 17 is mounted on the second and third members 60, rails 16 and 17 are—in the manner illustrated in FIG. 1—parallel. Each bracket 15 is secured to its associated fastener 71 (1) by placing bracket 15 over the upwardly extending distal end 71 E (FIG. 7) of fastener 71 such that bracket 15 is generally in the orientation depicted in FIG. 2, such that fastener 71 extends upwardly through ovate opening 31 (FIG. 3), and such that horizontally oriented lower leg 15A (FIG. 2) rests against upper surface 60A (FIG. 7), and (2) by threading a nut on to the distal end 71E. Each nut is tightened on fastener 71 sufficiently to maintain bracket 15 on the fastener 71, but not so tight as to prevent limited sliding movement of the lower leg 15A of bracket 15 about fastener 71 over the upper surface 60A of member 50. As noted earlier, the bottom leg 15A of L-shaped anchor member 15 includes an elongate oval opening 31 (FIG. 3) formed therethrough so that once a nut is installed on the distal end of a fastener 71 to secure loosely the linkage of member 15 to fastener 71 and its associated member 60, opening 31 permits the bottom leg of member 15 to slide freely loosely back and forth about fastener 71 in directions indicated by arrows D (FIG. 2). The magnitude and extent of such sliding movement is limited and restricted by ovate opening 31. In an alternative embodiment of the invention, each nut is tightened such that the bottom leg 15A of member 15 is tightly secured to upper surface 60A of base 61 and cannot slide back and forth about fastener 71.

Eliminating members 11 and utilizing members 60 in the manner described above allows cover 10 to more freely contact and expand intermediate members 60 in the directions indicated by arrows D in FIG. 2.

Figure 10:
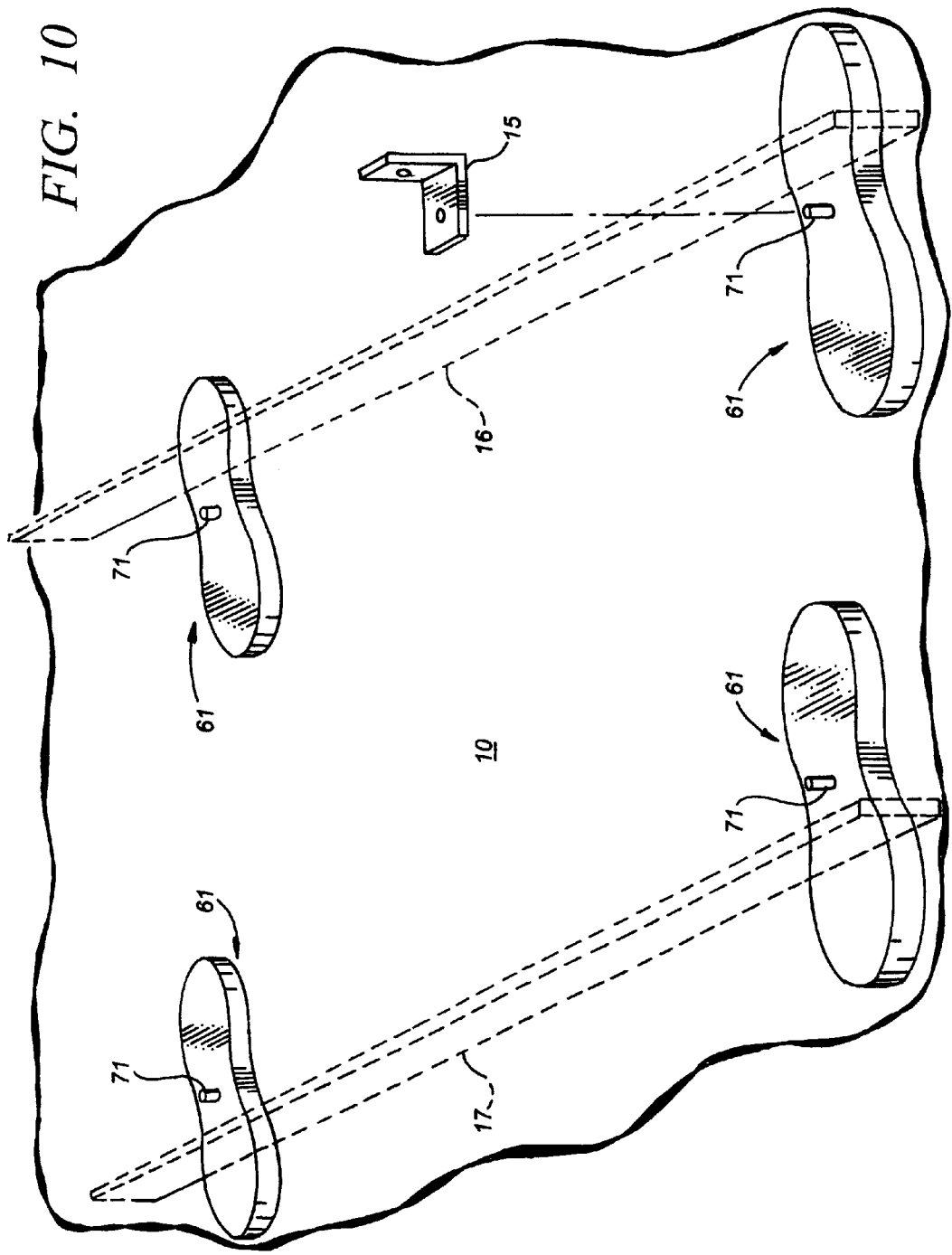
FIG. 10 is a perspective view illustrating the use of the support member of FIG. 7 in an alternate embodiment of the invention; and, FIG. 11 is a perspective view further illustrating the use of the support member of FIG. 7 in an alternate embodiment of the invention.

FIG. 10 further illustrates the utilization of support members 60 in accordance with an alternate embodiment of the invention. The spaced apart bases 61 and associated fasteners 71 of first, second, third and fourth polymer support members 60 are depicted in FIG. 10. A different bracket 15 is operatively associated with each of the four support members 60. Each bracket 15 is used to secure a rail 16 or 17, as the case may be, to a base 61. Although only a single bracket 15 is illustrated in FIG. 10, each base 61 would, of course, have its own separate associated bracket 15 so that there would be four separate brackets 15 each used with a different one of the bases 61 illustrated in FIG. 10.

Figure 11:
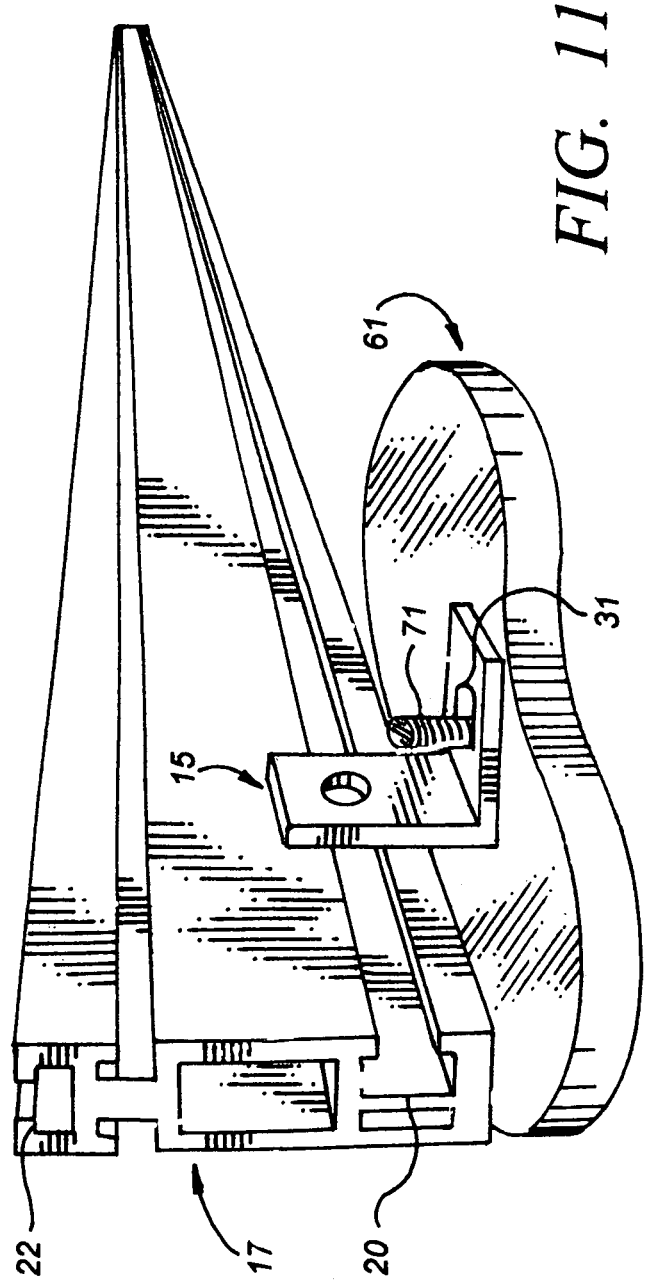

The use of a bracket 15 in conjunction with a base 61 to secure a rail 16, 17 to a base 61 is illustrated further in FIG. 11. The externally threaded distal end of fastener 71 extends through elongate aperture 31 in the manner illustrated in FIG. 11. The bracket 15 in FIG. 11 is secured to rail 17 in the manner illustrated in FIGS. 2 and 3; namely, a connector member 34 extends through the aperture in the upstanding leg of bracket 15 such that head 21 is slidably received by channel 20. The lower, or horizontally oriented, leg of bracket 15 is secured to fastener 71 by, as noted earlier, threading a nut (not shown) onto externally threaded fastener 71.

Having described my invention in such terms as to enable those of skill in the art to understand and use it, and having described the presently preferred embodiments and best mode thereof.

I claim:

1. A method to install solar panels over a landfill having an upper surface and a support structure to compensate for expansion and contraction and improve shedding of rain water, including the steps of
   (a) providing at least one orthogonal solar panel having
      (i) a pair of opposing substantially parallel spaced apart side edges,
      (ii) a top edge normal to said side edges, and
      (iii) a bottom edge spaced apart and substantially parallel to said top edge and normal to said side edges;
   (b) providing a flexible polymer cover;
   (c) providing at least first, second, third, and fourth polymer support members each having
      (i) a first end,
      (ii) a second end,
      (iii) a middle section intermediate said first and second ends,
      (iv) a base,
      (v) a skirt thermally bonded to said base,
      (vi) at least a first fastener shaped and dimensioned to extend downwardly through said polymer support member and said cover into the support structure,
      (vii) at least a second fastener shaped and dimensioned to extend upwardly through and outwardly from said polymer support member, (d) providing at least first and second elongate metal rails each having a coefficient of expansion less than that of said polymer support members and including
  (i) a longitudinal axis,
  (ii) a top extending parallel to said longitudinal axis,
  (iii) a side substantially normal to said top and extending parallel to said longitudinal axis,
  (iv) a first channel extending inwardly from said top in a first direction, parallel to said longitudinal axis, and including at least a first capture flange (22A, 22B),
  (v) a second channel extending inwardly from said side in a second direction normal to said first direction, parallel to said longitudinal axis, and including at least a second capture flange (20A, 20B);
(e) providing at least a first clip to secure said solar panel to said first metal rail and including
  (i) an upper portion shaped and dimensioned to engage said bottom edge of said solar panel and maintain a portion of said solar panel-adjacent said first metal rail,
  (ii) a first connector member to extend loosely into said first channel of said first rail for free sliding movement therealong in a third direction parallel to said longitudinal axis and said top of said first rail and shaped and dimensioned to be retained in said first channel of said first rail by said first capture flange of said first rail such that said connector member is free to move with respect to said first rail and can not be removed from said first channel of said first rail in a direction normal to said top of said first rail;
(f) providing at least a first anchor member to secure said first rail to said first polymer support member and including
  (i) an attachment system to engage said second fastener and secure freely slidably said first anchor member to said first polymer support member such that said first rail is free to move with respect to said first polymer support member, and
  (ii) a second connector member to extend loosely into said second channel of said first rail for free sliding movement therealong in said third direction parallel to said longitudinal axis and said top of said first rail and shaped and dimensioned to be retained in said second channel of said first rail by said second capture flange of said first rail such that said first rail is free to move with respect to said second connector member and said second connector member can not be removed from said first channel of said first rail in a direction normal to said side of said first rail;
(g) installing said polymer cover on said upper surface of said landfill;
(h) fixedly mounting said first, second, third, and fourth polymer support members on said polymer cover such that
  (i) said first fastener of each of said polymer support members extends through said polymer cover into the support structure,
  (ii) said first, second, third, and fourth polymer support members are in spaced apart parallel relationship, and
  (iii) said skirt of each of said polymer support members is thermally welded to said polymer cover;
(i) slidably attaching with said first anchor member said first rail to said first polymer support member such that
  (i) said second connection system freely slidably secures said first anchor member to said first fastener of said first polymer support member,
  (ii) said third connector member slidably loosely extends into said first channel of said first rail for free sliding movement therealong in said third direction, and,
  (iii) said first rail extends from said first polymer support member to said second polymer support member;
(j) attaching said second rail to said third and fourth polymer support members such that said second rail is substantially parallel to said first rail;
(k) placing said solar panel on top of and spanning the distance between said first and second parallel rails;
(l) slidably securing with said first clip said solar panel to said first rail such that
  (i) said upper portion of said first clip engages said bottom edge of said solar panel, and
  (ii) said first connector member loosely extends into said first channel of said first rail for free sliding movement therealong;
said free sliding loose movement of
(m) said first anchor member with respect to said first polymer support member;
(n) said second connector member with respect to second channel of said first rail, and
(o) said first connector member with respect to said first channel of said first rail, along with said polymer cover freely expanding and contracting between said first, second, third, and fourth polymer supports members,
compensating for the expansion and contraction of said polymer by permitting said first rail, said first connector, and said second connector to slidably move and,
consequently, minimizing the likelihood of damage to said solar panel, said polymer cover, said polymer support members, and said rails.

2. A method to install solar panels over a landfill having an upper surface and a support structure to compensate for expansion and contraction and improve shedding of rain water, including the steps of
(a) providing at least one orthogonal solar panel having
  (i) a pair of opposing substantially parallel spaced apart side edges,
  (ii) a top edge normal to said side edges, and
  (iii) a bottom edge spaced apart and substantially parallel to said top edge and normal to said side edges;
(b) providing a flexible polymer cover;
(c) providing at least first, second, third, and fourth polymer support members each having
  (i) a first end,
  (ii) a second end,
  (iii) a middle section intermediate said first and second ends,
  (iv) a base,
  (v) a skirt thermally bonded to said base,
  (vi) at least a first fastener shaped and dimensioned to extend downwardly through said polymer support member and said cover into the support structure,
  (vii) at least a second fastener shaped and dimensioned to extend upwardly through and outwardly from said polymer support member,
(d) providing at least first and second elongate metal rails each having a coefficient of expansion less than that of said polymer support members and including
  (i) a longitudinal axis,
  (ii) a top extending parallel to said longitudinal axis,
  (iii) a side substantially normal to said top and extending parallel to said longitudinal axis, (iv) a first channel extending inwardly from said top in a first direction, parallel to said longitudinal axis, and including at least a first capture flange (22A, 22B), (v) a second channel extending inwardly from said side in a second direction normal to said first direction, parallel to said longitudinal axis, and including at least a second capture flange (20A, 20B);

(e) providing at least a first clip to secure said solar panel to said first metal rail and including (i) an upper portion shaped and dimensioned to engage said bottom edge of said solar panel and maintain a portion of said solar panel adjacent said first metal rail, (ii) a first connector member to extend into said first channel of said first rail for sliding movement therealong in a third direction parallel to said longitudinal axis and said top of said first rail and shaped and dimensioned to be retained in said first channel of said first rail by said first capture flange of said first rail such that said connector member can not be removed from said first channel of said first rail in a direction normal to said top of said first rail;

(f) providing at least a first anchor member to secure said first rail to said first polymer support member and including (i) an attachment system to engage said second fastener and secure said first anchor member to said first polymer support member, and (ii) a second connector member to extend into said second channel of said first rail for sliding movement therealong in said third direction parallel to said longitudinal axis and said top of said first rail and shaped and dimensioned to be retained in said second channel of said first rail by said second capture flange of said first rail such that said second connector member can not be removed from said first channel of said first rail in a direction normal to said side of said first rail;

(g) installing said polymer cover on said upper surface of said landfill;

(h) fixedly mounting said first, second, third, and polymer support members on said polymer cover such that (i) said first fastener of each of said polymer support members extends through said polymer cover into the support structure, (ii) said first, second, third, and fourth polymer support members are in spaced apart parallel relationship, and (iii) said skirt of each of said polymer support members is thermally welded to said polymer cover;

(i) slidably attaching with said first anchor member said first rail to said first polymer support member such that (i) said second connection system secures said first anchor member to said first fastener of said first polymer support member, (ii) said third connector member slidably extends into said first channel of said first rail for sliding movement therealong in said third direction, and, (iii) said first rail extends from said first polymer support member to said second polymer support member;

(j) attaching said second rail to said third and fourth polymer support members such that said second rail is substantially parallel to said first rail;

(k) placing said solar panel on top of and spanning the distance between said first and second parallel rails;

(l) slidably securing with said first clip said solar panel to said first rail such that (i) said upper portion of said first clip engages said bottom edge of said solar panel, and (ii) said first connector member extends into said first channel of said first rail for sliding movement therealong.

3. A method to install solar panels over a landfill having an upper surface and a support structure to compensate for expansion and contraction and improve shedding of rain water, including the steps of (a) providing at least one orthogonal solar panel having (i) a pair of opposing substantially parallel spaced apart side edges, (ii) a top edge normal to said side edges, and (iii) a bottom edge spaced apart and substantially parallel to said top edge and normal to said side edges;

(b) providing a flexible polymer cover;

(c) providing at least first, second, third, and fourth polymer support members each having (i) a first end, (ii) a second end, (iii) a middle section intermediate said first and second ends, (d) providing at least first and second elongate metal rails each having a coefficient of expansion less than that of said polymer support members and including (i) a longitudinal axis, (ii) a top extending parallel to said longitudinal axis, (iii) a side substantially normal to said top and extending parallel to said longitudinal axis, (iv) a first channel extending inwardly from said top in a first direction, parallel to said longitudinal axis, and including at least a first capture flange (22A, 22B), (v) a second channel extending inwardly from said side in a second direction normal to said first direction, parallel to said longitudinal axis, and including at least a second capture flange (20A, 20B);

(e) providing at least a first clip to secure said solar panel to said first metal rail and including (i) an upper portion shaped and dimensioned to engage said bottom edge of said solar panel and maintain a portion of said solar panel adjacent said first metal rail, (ii) a first connector member to extend loosely into said first channel of said first rail for free sliding movement therealong in a third direction parallel to said longitudinal axis and said top of said first rail and shaped and dimensioned to be retained in said first channel of said first rail by said first capture flange of said first rail such that said connector member is free to move with respect to said first rail and can not be removed from said first channel of said first rail in a direction normal to said top of said first rail;

(f) providing at least a first anchor member to secure said first rail to said first polymer support member and including (i) an attachment system to engage said second fastener and secure freely slidably said first anchor member to said first polymer support member such that said first rail is free to move with respect to said first polymer support member, and (ii) a second connector member to extend loosely into said second channel of said first rail for free sliding movement therealong in said third direction parallel to said longitudinal axis and said top of said first rail and shaped and dimensioned to be retained in said second channel of said first rail by said second capture flange of said first rail such that said first rail is free to move with respect to said second connector member and said second connector member can not be removed from said first channel of said first rail in a direction normal to said side of said first rail;

(g) installing said polymer cover on said upper surface of said landfill;

(h) fixedly mounting said first, second, third, and fourth polymer support members on said polymer cover such that said first, second, third, and fourth polymer support members are in spaced apart parallel relationship;

(i) slidably attaching with said first anchor member said first rail to said first polymer support member such that
   (i) said second connection system freely slidably secures said first anchor member to said first polymer support member,
   (ii) said second connector member slidably loosely extends into said first channel of said first rail for free sliding movement therealong in said third direction, and,
   (iii) said first rail extends from said first polymer support member to said second polymer support member;

(j) attaching said second rail to said third and fourth polymer support members such that said second rail is substantially parallel to said first rail;

(k) placing said solar panel on top of and spanning the distance between said first and second parallel rails;

(l) slidably securing with said first clip said solar panel to said first rail such that
   (i) said upper portion of said first clip engages said bottom edge of said solar panel, and
   (ii) said first connector member slidably loosely extends into said first channel of said first rail for free sliding movement therealong;

said free loose sliding movement of
(m) said first anchor member with respect to said first polymer support member;
(n) said second connector member with respect to second channel of said first rail, and
(o) said first connector member with respect to said first channel of said first rail, along with said polymer cover freely expanding and contracting between said first, second, third, and fourth polymer support members, compensating for the expansion and contraction of said polymer cover by permitting said first rail, said first connector, and said second connector to freely slidably loosely move and, consequently, minimizing the likelihood of damage to said solar panel, said polymer cover, said polymer support members, and said rails.

* * * * *